(12) United States Patent
Shin et al.

(10) Patent No.: US 11,550,685 B2
(45) Date of Patent: Jan. 10, 2023

(54) MODE CONTROLLER AND INTEGRATED CIRCUIT CHIP INCLUDING THE SAME

(71) Applicant: SAMSUNG ELECTRONICS CO., LTD., Suwon-si (KR)

(72) Inventors: Jongseon Shin, Suwon-si (KR); Kihong Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 16/929,419

(22) Filed: Jul. 15, 2020

(65) Prior Publication Data

US 2021/0133064 A1    May 6, 2021

(30) Foreign Application Priority Data

Nov. 5, 2019  (KR) ........................ 10-2019-0140327

(51) Int. Cl.

| | |
|---|---|
| *G06F 11/27* | (2006.01) |
| *G06F 21/76* | (2013.01) |
| *G06F 7/58* | (2006.01) |
| *G06F 11/263* | (2006.01) |
| *G01R 31/3183* | (2006.01) |
| *G01R 31/317* | (2006.01) |

(Continued)

(52) U.S. Cl.
CPC .............. *G06F 11/27* (2013.01); *G06F 7/588* (2013.01); *G06F 21/76* (2013.01); *G01R 31/31707* (2013.01); *G01R 31/318385* (2013.01); *G06F 7/58* (2013.01); *G06F 7/582* (2013.01); *G06F 11/263* (2013.01); *G06F 21/74* (2013.01); *G11C 29/12* (2013.01)

(58) Field of Classification Search
CPC ........ G06F 7/588; G06F 7/582; G06F 11/263; G06F 7/58; G06F 21/76; G06F 21/74; G11C 29/12; G01R 31/318385; G01R 31/31724; G01R 31/31813; G01R 31/31701

See application file for complete search history.

(56) References Cited

U.S. PATENT DOCUMENTS

| | | |
|---|---|---|
| 6,651,196 B1 | 11/2003 | Iwase et al. |
| 7,372,760 B2 | 5/2008 | Nagatomi et al. |
| 7,890,737 B2 | 2/2011 | Ito et al. |

(Continued)

FOREIGN PATENT DOCUMENTS

| | | |
|---|---|---|
| JP | 2713123 B2 | 10/1997 |
| JP | 3489742 B2 | 11/2003 |

(Continued)

*Primary Examiner* — April Y Blair
*Assistant Examiner* — Sazzad Hossain
(74) *Attorney, Agent, or Firm* — Lee IP Law, P.C.

(57) ABSTRACT

An integrated circuit chip includes a plurality of function blocks; a mode controller configured to convert an input signal, received from an external device through an input/output pin, into an input pattern and test mode setting data which include a plurality of bits, and to output the test mode setting data and a mode switching enable signal when a secure pattern generated therein is the same as the input pattern; and a mode setting module configured to control the plurality of function blocks to operate in a test mode according to the mode setting data, in response to the test mode switching enable signal.

18 Claims, 11 Drawing Sheets

(51) Int. Cl.
   *G11C 29/12* (2006.01)
   *G06F 21/74* (2013.01)

(56) References Cited

U.S. PATENT DOCUMENTS

2014/0201252 A1* 7/2014 Brocker .............. G06F 11/2205
                                                          708/250
2021/0042447 A1* 2/2021 Doll ........................ G06F 21/75

FOREIGN PATENT DOCUMENTS

| | | | |
|---|---|---|---|
| JP | 2006-029948 A | 2/2006 |
| JP | 4214610 B2 | 11/2008 |
| JP | 4660115 B2 | 1/2011 |
| KR | 10-0403955 B1 | 10/2003 |
| KR | 10-0625753 B1 | 9/2006 |

* cited by examiner

MODE CONTROLLER AND INTEGRATED CIRCUIT CHIP INCLUDING THE SAME

CROSS-REFERENCE TO RELATED APPLICATION

Korean Patent Application No. 10-2019-0140327, filed on Nov. 5, 2019, in the Korean Intellectual Property Office, and entitled: "Mode Controller and Integrated Circuit Chip Including the Same," is incorporated by reference herein in its entirety.

BACKGROUND

1. Field

Embodiments relate to a mode controller and integrated circuit chip including the same.

2. Description of the Related Art

A smart card has therein an integrated circuit (IC) chip capable of processing a particular task with a microprocessor, an operating system, a security module, a memory, and the like. The smart card has excellent security and is easy to carry. Therefore, the IC chip requires security, and the number of input/output pins of the IC chip may be small.

SUMMARY

Embodiments are directed to an integrated circuit chip, including: a plurality of function blocks; a mode controller configured to convert an input signal, received from an external device through an input/output pin, into an input pattern and test mode setting data which include a plurality of bits, and to output the test mode setting data and a mode switching enable signal when a secure pattern generated therein is the same as the input pattern; and a mode setting module configured to control the plurality of function blocks to operate in a test mode according to the mode setting data, in response to the test mode switching enable signal.

Embodiments are also directed to a mode controller for controlling operation mode switching of an integrated circuit chip that includes the mode controller, the mode controller including a demodulator configured to convert an input signal, received from an external device through an input/output pin, into an input pattern and mode setting data which include a plurality of bits; a random number generator configured to generate a secure pattern for mode switching; and a comparator configured to compare the input pattern to the secure pattern, and to output the mode setting data and a mode switching enable signal when the input pattern is the same as the secure pattern.

Embodiments are also directed to a system on chip, including a processor; a volatile memory configured to store instructions and data to be used by the processor; a non-volatile memory configured to store user data; and a mode controller configured to convert an input signal, received from an external device through one input/output pin, into input data, and to control an operation mode of the system on chip to be switched to a test mode when an input pattern included in the input data matches a secure pattern generated therein.

BRIEF DESCRIPTION OF THE DRAWINGS

Features will become apparent to those of skill in the art by describing in detail example embodiments with reference to the attached drawings in which.

DETAILED DESCRIPTION

Figure 1:
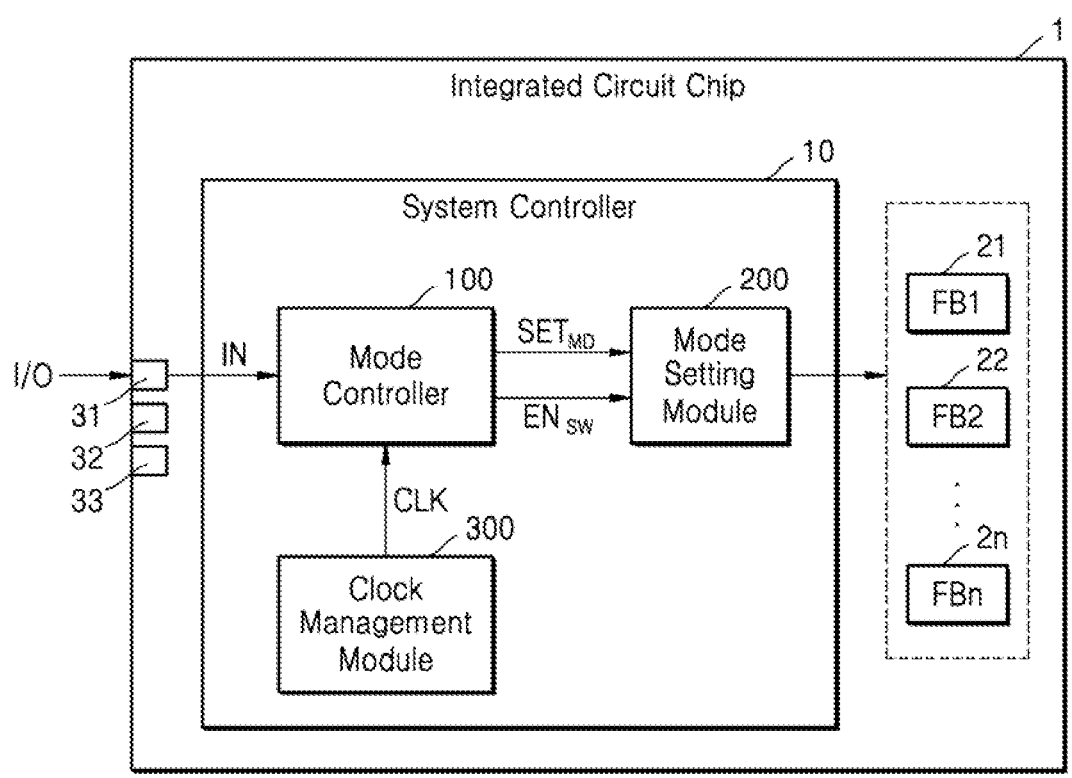
FIG. 1 is a block diagram of an integrated circuit chip according to an example embodiment.

FIG. 1 is a block diagram of an integrated circuit chip 1 according to an example embodiment.

Referring to FIG. 1, the integrated circuit chip 1 may include a system controller 10 and two or more function blocks, for example, function blocks 21 to 2n where n is an integer greater than or equal to 2. FIG. 1 illustrates function blocks 21, 22, . . . , 2n as an example. The integrated circuit chip 1 may transmit and receive a signal to and from an external device through a plurality of pins, for example, first to third pins 31, 32, and 33.

The integrated circuit chip 1 may be a System on Chip (SoC) and may be mounted on a smart card, a subscriber identification module (SIM) card, or the like. In other implementations, the integrated circuit chip 1 may be embedded in an electronic device or may be mounted, as an integrated circuit chip attachable to or detachable from an electronic device, on, for example, an embedded universal flash storage (UFS) memory device, an embedded multimedia card (eMMC), a UFS memory card, a compact flash (CF) card, a secure digital (SD) card, a micro secure digital (micro-SD) card, a mini secure digital (mini-SD) card, an extreme digital (XD) card, a memory stick, or the like.

Although FIG. 1 shows that the integrated circuit chip 1 includes three pins 31, 32, and 33, the number of pins included in the integrated circuit chip 1 may be changed according to a type of a device on which the integrated circuit chip 1 is mounted, an operating method of the integrated circuit chip 1, or the like.

At least one of the first to third pins 31, 32, and 33 may be an input/output pin. For example, the first pin 31 may be an input/output pin, and the second and third pins 32 and 33 may be a power reception pin and a ground pin, respectively. In other implementations, the number of pins and a pin configuration may be varied. For example, the integrated circuit chip 1 may further include a pin through which an external clock is received, a pin through which a reset signal is received, and the like.

The plurality of function blocks 21 to 2n may be circuits, devices, or modules for performing functions provided by the integrated circuit chip 1. For example, when the integrated circuit chip 1 is a System on Chip, the plurality of function blocks 21 to 2n may include a processor, read only memory (ROM), random access memory (RAM), electrically erasable programmable read only memory (EEPROM), a nonvolatile memory device, an encryption engine, a communication module, and the like. The plurality of function blocks 21 to 2n may be implemented by hardware, software (or firmware), or a combination of hardware and software.

The system controller 10 may control a system configuration of the integrated circuit chip 1, for example, control power, a clock signal, system reset, and the like. The system controller 10 may also determine or switch an operation mode of the integrated circuit chip 1. For example, the system controller 10 may determine a test mode, a user mode (or normal operation mode), a scan mode, or the like. The plurality of function blocks 21 to 2n may operate according to an operation set by the system controller 10.

When the integrated circuit chip 1 is tested, the system controller 10 may determine whether to switch to the test mode, based on an input signal received from the outside (for example, a test device) through at least one of the first to third pins 31, 32, and 33. When the integrated circuit chip 1 enters the test mode, at least one of the plurality of function blocks 21 to 2n may be tested. In the test mode, particular functions (hidden functions) for a test, which are not performed in the other operation modes (for example, the user mode), may be performed.

The system controller 10 may include a mode controller 100, a mode setting module 200, and a clock management module 300.

The mode controller 100 may determine whether to switch a mode based on an input signal IN received from one of the first to third pins 31, 32, and 33, for example, the input/output pin 31. When a mode switching condition is satisfied, the mode controller 100 may output mode setting data $SET_{MD}$ indicating a mode to be switched and a mode switching enable signal $EN_{SW}$. According to an example embodiment, the mode controller 100 may determine switching to the test mode, and the mode setting data $SET_{MD}$ may indicate one of a plurality of test modes. The mode setting data $SET_{MD}$ may be referred to as a test mode setting data.

The mode controller 100 may convert the input signal IN into an input pattern and the mode setting data $SET_{MD}$, which include a plurality of bits, and, when a secure pattern generated therein is the same as the input pattern, output the mode setting data $SET_{MD}$ and the mode switching enable signal $EN_{SW}$. The mode controller 100 may stop an operation when the input pattern is different from the secure pattern.

The mode setting module 200 may set (or switch) an operation mode based on the mode setting data $SET_{MD}$ and the mode switching enable signal $EN_{SW}$ output from the mode controller 100 and control the plurality of function blocks 21 to 2n so as to be operated in a set mode. For example, the mode setting module 200 may output control signals for controlling the plurality of function blocks 21 to 2n so as to be operated in a set mode. For example, the control signals may include a signal indicating a set mode, configuration setting values of the plurality of function blocks 21 to 2n according to the set mode, or the like.

The clock management module 300 may manage an operating speed of the integrated circuit chip 1, generate clock signals to be used for the system controller 10 and the plurality of function blocks 21 to 2n, and adjust a frequency of the clock signals. The mode controller 100 may operate based on a clock signal CLK received from the clock management module 300.

Figure 2:
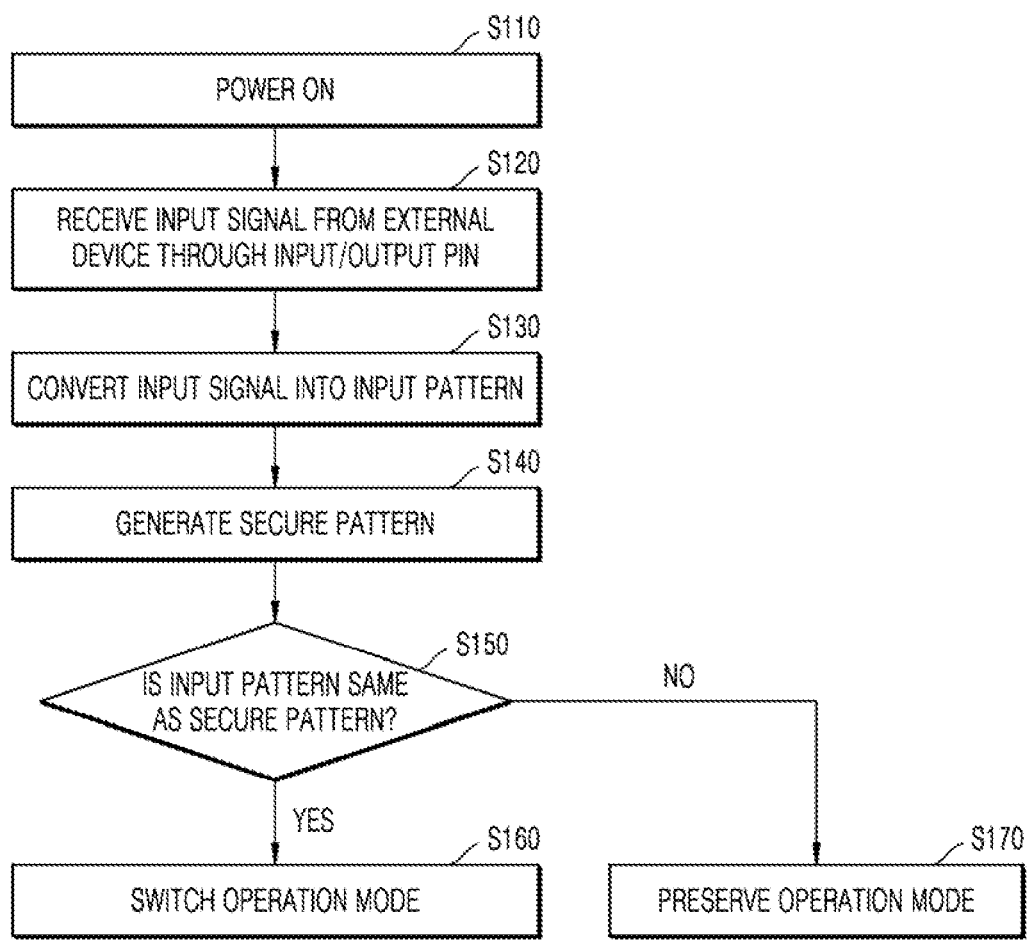
FIG. 2 is a flowchart of an operating method of an integrated circuit chip, according to an example embodiment.

FIG. 2 is a flowchart of an operating method of an integrated circuit chip, according to an example embodiment. The method in FIG. 2 indicates an operation mode switching method of an integrated circuit chip and may be performed by the integrated circuit chip 1 of FIG. 1.

Referring to FIG. 2, in operation S110, the integrated circuit chip is powered on. In operation S120, the integrated circuit chip may receive an input signal from an external device through an input/output pin. The integrated circuit chip may be connected to an external device, for example, a host, in a wireless or wired manner and may be powered on by receiving power from the host. The integrated circuit chip may receive an input signal from the host through the input/output pin and output a response signal through the same input/output pin. According to an example embodiment, the integrated circuit chip may receive an input signal through a single input/output pin.

In operation S130, the integrated circuit chip may convert the input signal into an input pattern. For example, an encrypted input signal may be received, and the integrated circuit chip may generate the input pattern by demodulating the input signal.

In operation S140, the integrated circuit chip may generate a secure pattern. The integrated circuit chip may include a pattern generator, and the pattern generator may generate a secure pattern. The pattern generator may be implemented by a random number generator that generates a secure pattern including a random number.

In operation S150, the integrated circuit chip may compare the input pattern to the secure pattern to determine identity. Each of the input pattern and the secure pattern may include a plurality of bits, and the integrated circuit chip may compare the plurality of bits in the input pattern to the plurality of bits in the secure pattern on a bitwise basis.

When the input pattern is the same as the secure pattern, the integrated circuit chip may switch an operation mode in operation S160. When the input pattern is different from the secure pattern, the integrated circuit chip may maintain the operation mode in operation S170. For example, the integrated circuit chip may perform operations S120 to S150 while operating in the user mode (or normal operation mode), enter the test mode, and operate in the test mode when it is determined that the input pattern is the same as the secure pattern, and may maintain the user mode when it is determined that the input pattern is different from the secure pattern. According to an example embodiment, operations S130 to S150 may be performed by the mode controller 100 of FIG. 1, and as described above, the mode controller 100 may compare the input pattern to the secure pattern on a bitwise basis. The mode controller 100 may end an operation when corresponding bits differ from each other in an operation of sequentially comparing the input pattern to the secure pattern on a bitwise basis. Accordingly, the integrated circuit chip may maintain a preset operation mode. Hereinafter, aspects of the mode controller 100 will be described in further detail.

Figure 3:
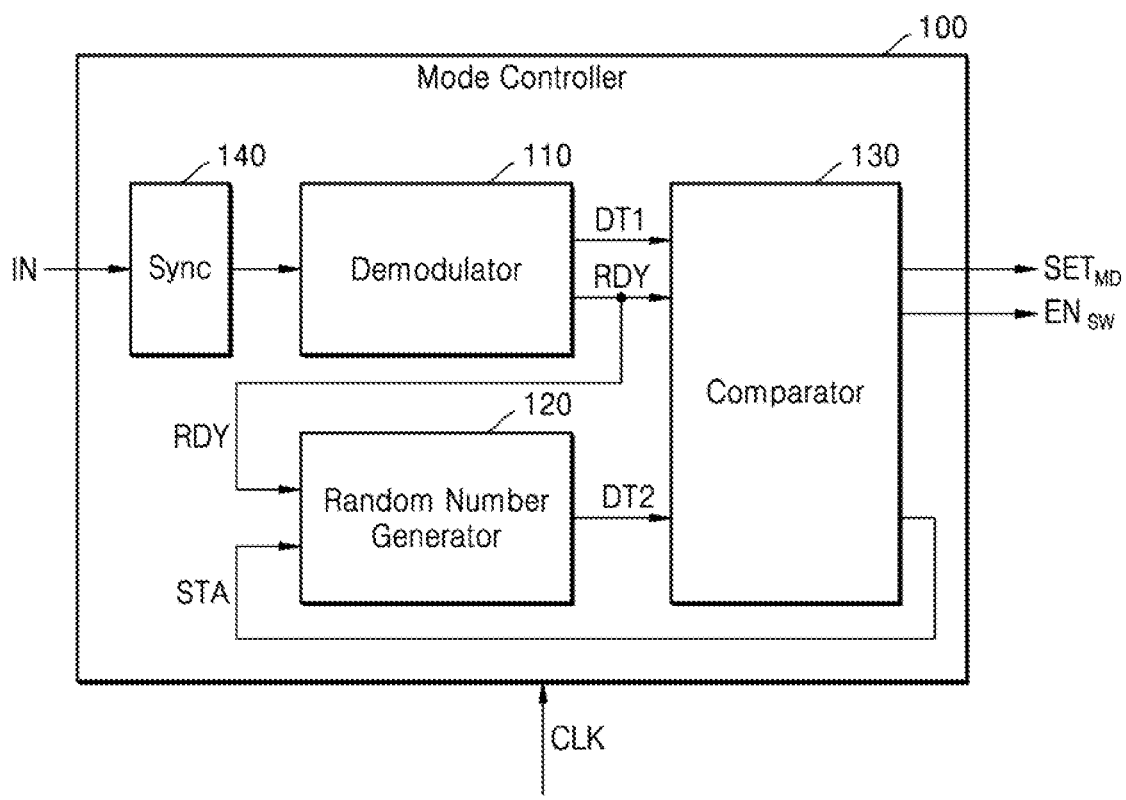
FIG. 3 is a block diagram of a mode controller according to an example embodiment.

FIG. 3 is a block diagram of the mode controller 100 according to an example embodiment.

Referring to FIG. 3, the mode controller 100 may include a demodulator 110, a random number generator 120, a comparator 130, and a synchronizer 140. The components of the mode controller 100, for example, the demodulator 110, the random number generator 120, the comparator 130, and the synchronizer 140, may operate based on the clock signal CLK.

The input signal IN received from the outside through the input/output pin (31 of FIG. 1) may be input to the demodulator 110 through the synchronizer 140. According to an example embodiment, the input signal IN may be received through one input/output pin. The synchronizer 140 may be implemented by, for example, a flip-flop, and the input signal IN output from the synchronizer 140 may be synchronized with the clock signal CLK.

The demodulator 110 may generate first data DT1 by demodulating the input signal IN. The demodulator 110 may convert the input signal IN received in series by a single wire protocol (SWP) scheme into the first data DT1 including a plurality of bits. The first data DT1 may include a particular pattern (which may be referred to herein as the input pattern) and a mode setting value corresponding to the mode setting data $SET_{MD}$. The input pattern may include a plurality of bits. For example, the input pattern may be data of 10 bits. The first data DT1 may include a frame start signal (which may be referred to herein as the start of frame (SOF)) indicating the beginning of a frame including the input pattern.

According to an example embodiment, the demodulator 110 may generate a ready signal RDY and one bit of the first data DT1 every time one bit of the input signal IN is converted into one bit of the first data DT1. In this case, one bit of the input signal IN may indicate an input between rising edges of the input signal IN. The ready signal RDY and the first data DT1 may be transmitted to the comparator 130. The ready signal RDY may also be transmitted to the random number generator 120.

The random number generator 120 may generate a secure pattern including a plurality of bits. The random number generator 120 may generate a random number every time the ready signal RDY is received from the demodulator 110. According to an example embodiment, the random number generator 120 may start operation when a start signal STA is received from the comparator 130, for example, when the start signal STA transitions from logic low to logic high, and the random number generator 120 may generate a secure pattern including a plurality of bits by generating a random number every time the ready signal RDY is received. The secure pattern may include a plurality of bits, and for example, the secure pattern may include a same number of bits as the input pattern. The secure pattern may be transmitted as second data DT2 to the comparator 130.

According to an example embodiment, the random number generator 120 may generate a unique secure pattern of the integrated circuit chip (1 of FIG. 1) by generating a random number based on a physical characteristic of the integrated circuit chip 1. In other implementations, the random number generator 120 may be implemented by a linear feedback shift register (LFSR) and may generate a random number based on a set seed value.

The comparator 130 may compare the first data DT1 received from the demodulator 110 to the second data DT2. When the first data DT1 is the same as the second data DT2, the comparator 130 may output signals for mode switching, for example, the mode setting data $SET_{MD}$ and the mode switching enable signal $EN_{SW}$.

For example, when the received first data DT1 includes SOF, the comparator 130 may generate the start signal STA and transmit the start signal STA to the random number generator 120. The random number generator 120 may be activated in response to the start signal STA and generate the secure pattern. The comparator 130 may compare the secure pattern received as the second data DT2 to the input pattern received as the first data DT1. The secure pattern and the input pattern may be received bit by bit, and the comparator 130 may compare the secure pattern to the input pattern on a bitwise basis.

When the secure pattern is the same as the input pattern, the comparator 130 may output the mode setting data $SET_{MD}$ and the mode switching enable signal $EN_{SW}$. According to an example embodiment, a mode setting value corresponding to the mode setting data $SET_{MD}$ may be generated by demodulating the input signal IN by the demodulator 110, and the demodulator 110 may transmit the mode setting value after transmitting the input pattern. The input pattern and the mode setting value may be received as the first data DT1 by the comparator 130. The comparator 130 may output the mode setting value as the mode setting data $SET_{MD}$.

According to an example embodiment, the mode setting data $SET_{MD}$ may indicate the test mode. The mode setting data $SET_{MD}$ may include a plurality of bits, and a type of the test mode may be determined depending on a data value of the mode setting data $SET_{MD}$.

The comparator 130 may end an operation when it is determined that the secure pattern is different from the input pattern. According to an example embodiment, the comparator 130 may be implemented by a state machine and may enter an infinite loop when non-identical bits exist in an operation of comparing the secure pattern to the input pattern. Alternatively, the comparator 130 may enter an infinite loop after outputting the mode setting data $SET_{MD}$ and the mode switching enable signal $EN_{SW}$. Accordingly, an operation of the comparator 130 and the mode controller 100 may stop. The comparator 130 and the mode controller 100 may re-operate after being rebooted. For example, the comparator 130 and the mode controller 100 may re-operate when the integrated circuit chip 1 is reset or when the integrated circuit chip 1 is rebooted by applying power thereto again after the power is cut off.

As described above, the mode controller 100 according to an example embodiment may demodulate an input signal received through an input/output pin to convert the input signal into an input pattern, and compare the input pattern to a secure pattern generated therein to determine switching of an operation mode, for example, switching to the test mode, and the secure pattern and the input pattern may include a plurality of bits. Because a possibility that another input signal received through the input/output pin matches the secure pattern is low, a possibility that the integrated circuit chip 1 switches to the test mode without an intention or by hacking is low.

In addition, the mode controller 100 according to an example embodiment may demodulate an input signal received through a general input/output pin and use the demodulation result to determine mode switching, and thus, an exclusive pin for the mode switching need not be implemented. Therefore, the number of pins required for the integrated circuit chip 1 and an area of the integrated circuit chip 1 may be reduced.

Figure 4A:
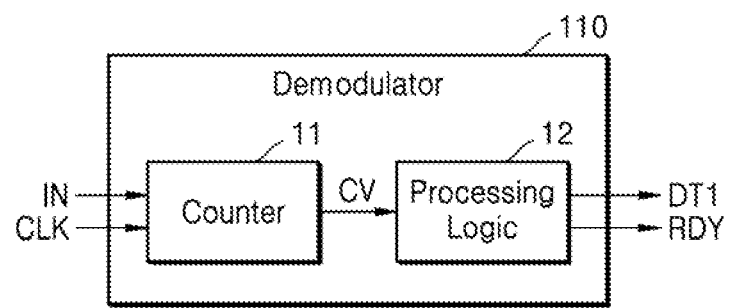
FIG. 4A is a block diagram of a demodulator included in a mode controller, according to an example embodiment.
Figure 4B:
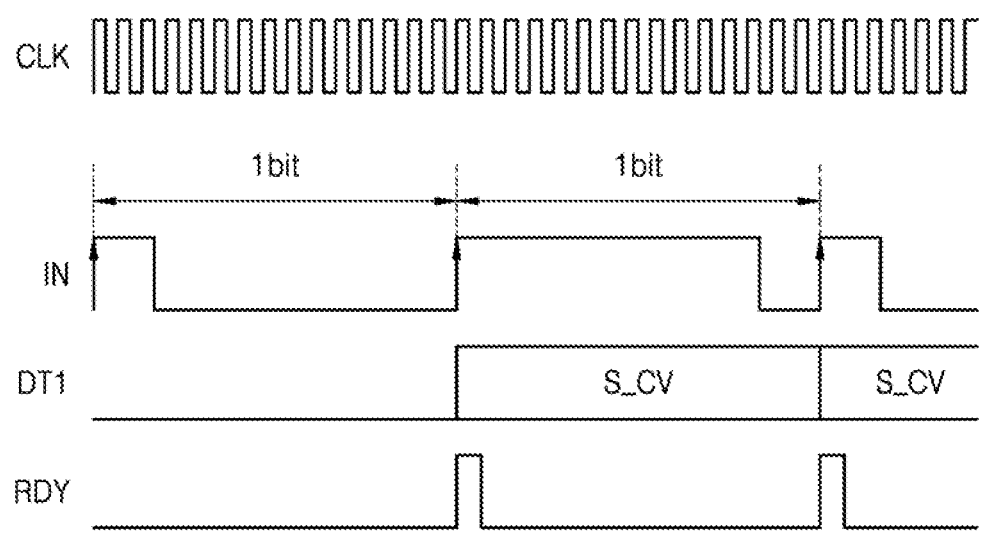
FIG. 4B is a timing diagram of input signals and output signals of the demodulator.

FIG. 4A is a block diagram of an example of the demodulator 110 included in a mode controller, according to an example embodiment, and FIG. 4B is a timing diagram of input signals and output signals of the demodulator 110.

Referring to FIG. 4A, the demodulator 110 may include a counter 11 and a processing logic 12.

The counter 11 may output a counting value CV by counting the input signal IN on a bitwise basis based on the clock signal CLK. Referring to FIG. 4B together with FIG. 4A, the counter 11 may count the input signal IN based on the clock signal CLK for a period from a rising edge of the input signal IN to a subsequent rising edge thereof or from a polling edge thereof to a subsequent falling edge thereof (for example, a period corresponding to one bit). For example, the counter 11 may increase the counting value CV when the input signal IN is logic high, and decrease the counting value CV when the input signal IN is logic low. Accordingly, the counting value CV corresponding to one bit of the input signal IN may be generated.

The processing logic 12 may output data based on the counting value CV, and the data may be output as the first data DT1. According to an example embodiment, the processing logic 12 may convert the counting value CV into data of one bit and output the data. For example, the processing logic 12 may output a sign S_CV of the counting value CV, i.e., a most significant bit (MSB) of the counting value CV, as the first data DT1.

The processing logic 12 may also output the ready signal RDY. When the counting value CV is received, the processing logic 12 may output the ready signal RDY. In another implementation, the processing logic 12 may output the ready signal RDY based on a rising edge or a falling edge of the input signal IN. The processing logic 12 may also output the ready signal RDY together with the first data DT1 generated based on the counting value CV, every time one bit of the input signal IN is counted.

Figure 5:
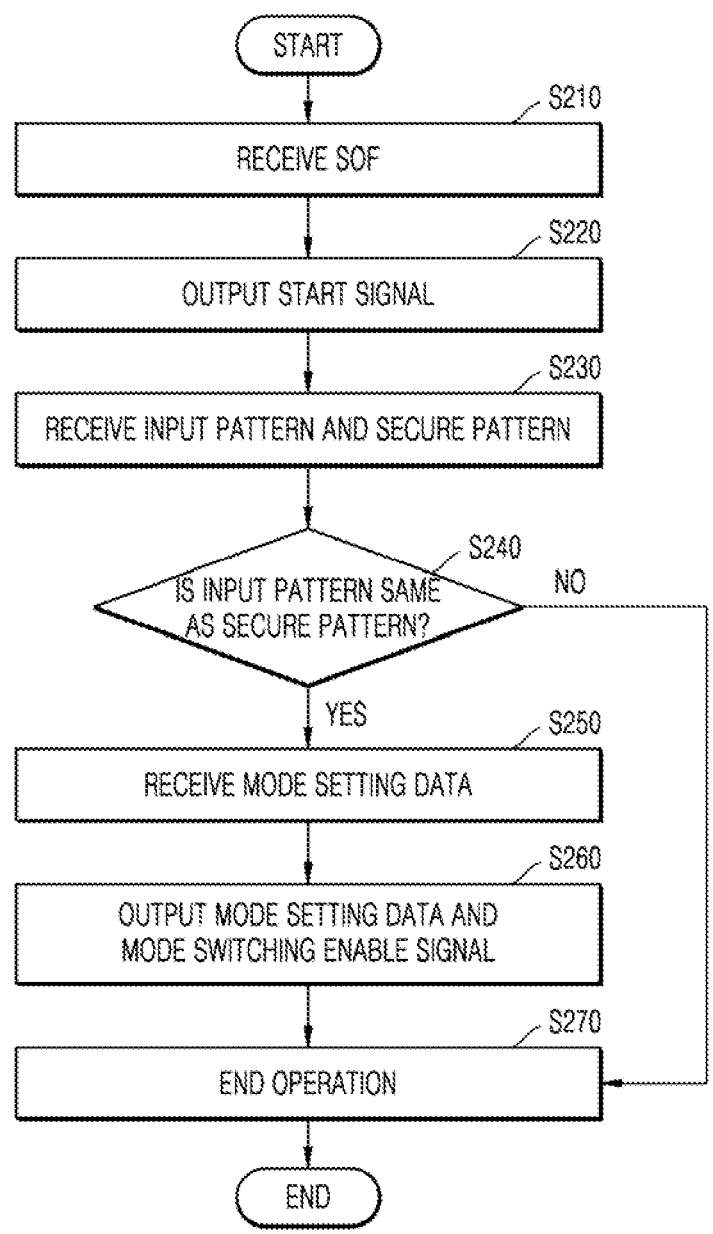
FIG. 5 is a flowchart of an operating method of a comparator included in a mode controller, according to an example embodiment.

FIG. 5 is a flowchart of an operating method of a comparator included in a mode controller, according to an example embodiment.

Referring to FIG. 5, in operation S210, the comparator (130 of FIG. 3) may receive SOF from the demodulator (110 of FIG. 3). For example, the SOF may include a plurality of bits, and a data value may be preset. For example, when the SOF is set to '1001', the comparator 130 may monitor received first data DT1, and when the first data DT1 includes '1001', the comparator 130 may determine that the SOF has been received.

In operation S220, the comparator 130 may output the start signal STA to the random number generator (120 of FIG. 3). The SOF may be a trigger signal of a mode switching operation and may indicate that an input pattern is received. Therefore, the comparator 130 may generate the start signal STA and transmit the start signal STA to the random number generator 120, and the random number generator 120 may generate a secure pattern by being activated in response to the start signal STA.

In operation S230, the comparator 130 may receive an input pattern from the demodulator 110 and receive a secure pattern from the random number generator 120. The random number generator 120 may generate the secure pattern in response to the ready signal RDY received from the comparator 130, and thus, a respective bit of the input pattern and a respective bit of the secure pattern may be received in synchronization with the ready signal RDY.

In operation S240, the comparator 130 may compare the input pattern to the secure pattern to determine identity. The comparator 130 may compare received two bits every time a respective bit of the input pattern and a respective bit of the secure pattern are received in synchronization with the ready signal RDY. When it is determined that all bits of the input pattern are respectively the same as all bits of the secure pattern, the comparator 130 may receive mode setting data from the demodulator 110 in operation S250. Otherwise, the method proceeds to operation S270.

In operation S250, the comparator 130 may receive mode setting data from the demodulator 110. The comparator 130 may store, as the mode setting data, the first data DT1 received after the input pattern. The mode setting data includes information about a mode to be switched. For example, the mode setting data may have a value indicating a test mode to be switched among a plurality of test modes.

In operation S260, the comparator 130 may output the mode setting data and a mode switching enable signal. The mode setting data may include a plurality of bits. When the entire mode setting data is received by receiving a corresponding number of bits, the comparator 130 may output the mode setting data and a mode switching enable signal.

In operation S270, the comparator 130 may end an operation thereof.

Figure 6:
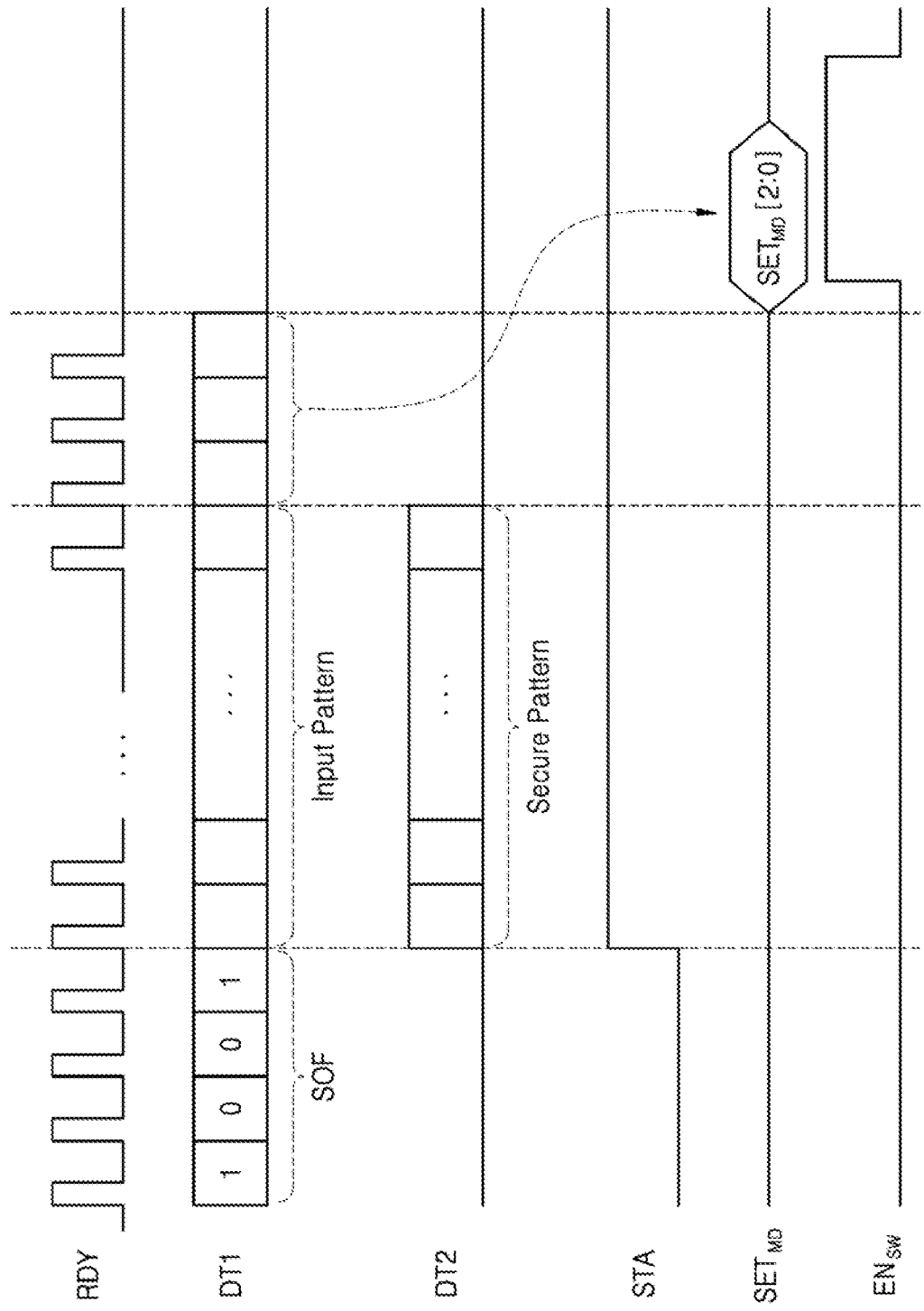
FIG. 6 is a timing diagram of input signals and output signals of a comparator included in a mode controller, according to an example embodiment.

FIG. 6 is a timing diagram of input signals and output signals of a comparator included in a mode controller, according to an example embodiment.

Referring to FIG. 6, the ready signal RDY and the first data DT1 may be received from the demodulator (110 of FIG. 3). When the received first data DT1 includes SOF, the comparator (130 of FIG. 3) may generate the start signal STA. When the random number generator (120 of FIG. 3) may be activated in response to the start signal STA and generate a secure pattern in synchronization with the ready signal RDY.

Thereafter, in synchronization with the ready signal RDY, the comparator 130 may receive the first data DT1 from the demodulator 110 and the second data DT2 from the random number generator 120. The first data DT1 may include an input pattern, and the second data DT2 may include the secure pattern.

The comparator 130 may compare the input pattern to the secure pattern, and when the input pattern is the same as the secure pattern, store the first data DT1 received thereafter as the mode setting data $SET_{MD}$. When the mode setting data $SET_{MD}$ is fully received, the comparator 130 may output the mode setting data $SET_{MD}$ and the mode switching enable signal $EN_{SW}$.

The mode setting data $SET_{MD}$ may be a multi-bit signal, and for example, three-bit mode setting data $SET_{MD}[2:0]$ may be output. The mode switching enable signal $EN_{SW}$ may be a toggle signal. When the mode switching enable signal $EN_{SW}$ is logic high, the mode setting module (200 of FIG. 1) may perform a configuration operation according to the mode setting data $SET_{MD}[2:0]$. Thus, when mode switching enable signal $EN_{SW}$ is logic high, mode switching to an operation mode according to the mode setting data $SET_{MD}[2:0]$ may be performed. A level of the mode switching enable signal $EN_{SW}$ may transit from an activation level, for example, logic high, to an inactivation level, for example, logic low, after a mode switching operation is performed.

Figure 7:
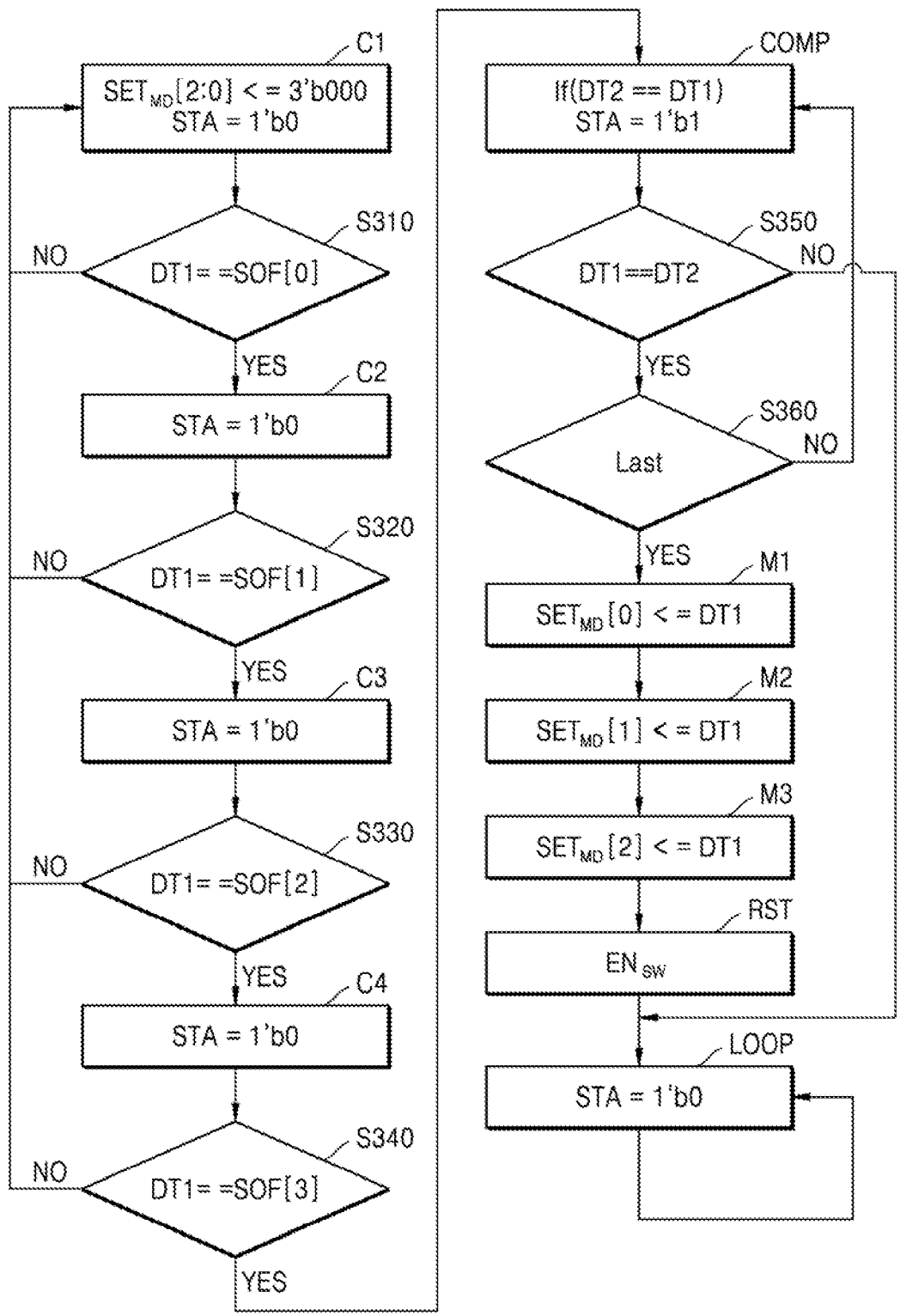
FIG. 7 is a flowchart of an algorithm of a state machine included in a mode controller, according to an example embodiment.

FIG. 7 is a flowchart of an algorithm of a state machine included in a mode controller, according to an example embodiment.

As described above, the comparator (130 of FIG. 3) in the mode controller (100 of FIG. 3) may be implemented by a state machine. FIG. 7 illustrates an algorithm of the state machine operating as the comparator 130. It is assumed by way of example that mode setting data is three-bit data, and SOF is four-bit data of '1001'.

Referring to FIG. 7, after power-on, in a C1 state (for example, in an initial state), the mode setting data $SET_{MD}[2:0]$ may be set to '000' (3'b000), and the start signal STA may be set to '0' (1'b0).

Thereafter, in operation S310, it may be determined whether first data DT1 received from the demodulator (110 of FIG. 3) is a first bit (SOF[0]), for example, '1', of SOF, and when the first data DT1 is not the first bit (SOF[0]) of the SOF, the state machine may return to the C1 state.

When the first data DT1 is the same as the first bit (SOF[0]) of the SOF, the state machine may be changed to a C2 state. In the C2 state, the start signal STA may be set to '0' (1'b0).

In operation S320, it may be determined whether first data DT1 received from the demodulator 110 is a second bit (SOF[1]), for example, '0', of the SOF, and when the first data DT1 is not the second bit (SOF[1]) of the SOF, the state machine may return to the C1 state.

When the first data DT1 is the same as the second bit (SOF[1]) of the SOF, the state machine may be changed to a C3 state. In the C3 state, the start signal STA may be set to '0' (1'b0).

In the C3 state, it may be determined in operation S330 whether first data DT1 received from the demodulator 110 is a third bit (SOF[2]), for example, '0', of the SOF, and when the first data DT1 is not the third bit (SOF[2]) of the SOF, the state machine may return to the C1 state.

When the first data DT1 is the same as the third bit (SOF[2]) of the SOF, the state machine may be changed to a C4 state. In the C4 state, the start signal STA may be set to '0' (1'b0).

In the C4 state, it may be determined in operation S340 whether first data DT1 received from the demodulator 110 is a fourth bit (SOF[3]), for example, '1', of the SOF, and when the first data DT1 is not the fourth bit (SOF[3]) of the SOF, the state machine may return to the C1 state. When the first data DT1 is the same as the fourth bit (SOF[3]) of the SOF, the state machine may be changed to a COMP state. In the C1 to C4 states, it may be monitored whether the SOF is received.

In the COMP state, the start signal STA may be set to '1' (1'b1), and it may be determined whether the first data DT1 is the same as the second data DT2.

It is determined in operation S350 whether received first data DT1 is the same as the second data DT2, and when the received first data DT1 is not the same as the second data DT2, the state machine may be changed to a LOOP state, for example, an infinite loop state.

When the first data DT1 is the same as the second data DT2, it may be determined in operation S360 whether there exist no bits to compare in the first data DT1 and the second data DT2. When there exist any bits to compare in the first data DT1 and the second data DT2, the state machine may return to the COMP state.

When there exist no bits to compare in the first data DT1 and the second data DT2, the state machine may be changed to an M1 state. In the M1 state, received first data DT1 is set to a first bit ($SET_{MD}[0]$) of mode setting data, and the state machine is changed to an M2 state. In the M2 state, received first data DT1 is set to a second bit ($SET_{MD}[1]$) of the mode setting data, and the state machine is changed to an M3 state. In the M3 state, received first data DT1 is set to a third bit ($SET_{MD}[2]$) of the mode setting data, and the state machine is changed to an RST state. In the RST state, the mode switching enable signal $EN_{SW}$ may be generated.

Thereafter, the state machine enters the LOOP state, for example, an infinite loop state. In the LOOP state, the start signal STA may be set to '0' (1'b0). When the state machine enters an infinite loop state, the mode controller 100 operation may end.

Figure 8:
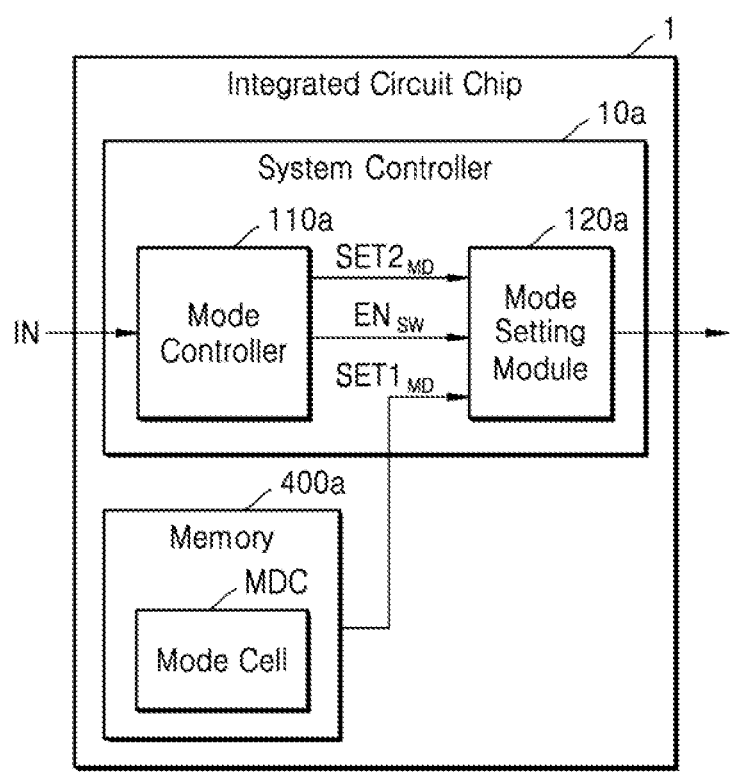
FIG. 8 is a block diagram for describing a mode switching operation of a system controller, according to an example embodiment.

FIG. 8 is a block diagram for describing a mode switching operation of a system controller 10a, according to an example embodiment.

Referring to FIG. 8, the system controller 10a may include a mode controller 110a and a mode setting module 120a. Operations of the mode controller 110a and the mode setting module 120a may be similar to the operations of the mode controller 100 and the mode setting module 200, which have been described with reference to FIG. 1.

The mode setting module 120a may receive mode setting data from a memory 400a. For convenience of description, the mode setting data received from the memory 400a is referred to as first mode setting data $SET1_{MD}$, and mode setting data received from the mode controller 110a is referred to as second mode setting data $SET2_{MD}$.

The memory 400a may be a main memory included in the integrated circuit chip 1 of FIG. 1 and may be a nonvolatile memory. For example, the memory 400a may be a flash memory. In a booting operation, for example, when the integrated circuit chip 1 is powered on and booted, the system controller 10a may read option values related to setting of the integrated circuit chip 1 from option cells of the memory 400a and control a system configuration of the integrated circuit chip 1.

The first mode setting data $SET1_{MD}$ may be stored in a mode cell MDC of the memory 400a, and in the booting operation, the mode setting module 120a may read the first mode setting data $SET1_{MD}$ and control the integrated circuit chip 1 so as to operate in an operation mode according to the first mode setting data $SET1_{MD}$. For example, when the first mode setting data $SET1_{MD}$ indicates the user mode, the integrated circuit chip 1 may operate in the user mode, and when the first mode setting data $SET1_{MD}$ indicates the test mode, the integrated circuit chip 1 may operate in the test mode When the input signal IN received through the input/output pin (31 of FIG. 1) includes an input pattern as described above with reference to FIG. 7, and the input pattern is the same as a secure pattern generated inside the mode controller 110a, the mode controller 110a may output the mode switching enable signal $EN_{SW}$ and the second mode setting data $SET2_{MD}$ to the mode setting module 120a. The mode setting module 120a may switch an operation mode of the integrated circuit chip 1 to a mode according to the second mode setting data $SET2_{MD}$, for example, the test mode, in response to the mode switching enable signal $EN_{SW}$.

For example, when the first mode setting data $SET1_{MD}$ indicates the user mode, and the second mode setting data $SET2_{MD}$ indicates the test mode, the integrated circuit chip 1 may operate in the user mode after booting, and when the input signal IN including an input pattern that is the same as the secure pattern is received through the input/output pin 31, the integrated circuit chip 1 may switch from the user mode to the test mode. When the integrated circuit chip 1 is re-booted, the integrated circuit chip 1 may operate in the user mode according to the first mode setting data $SET1_{MD}$.

Figure 9:
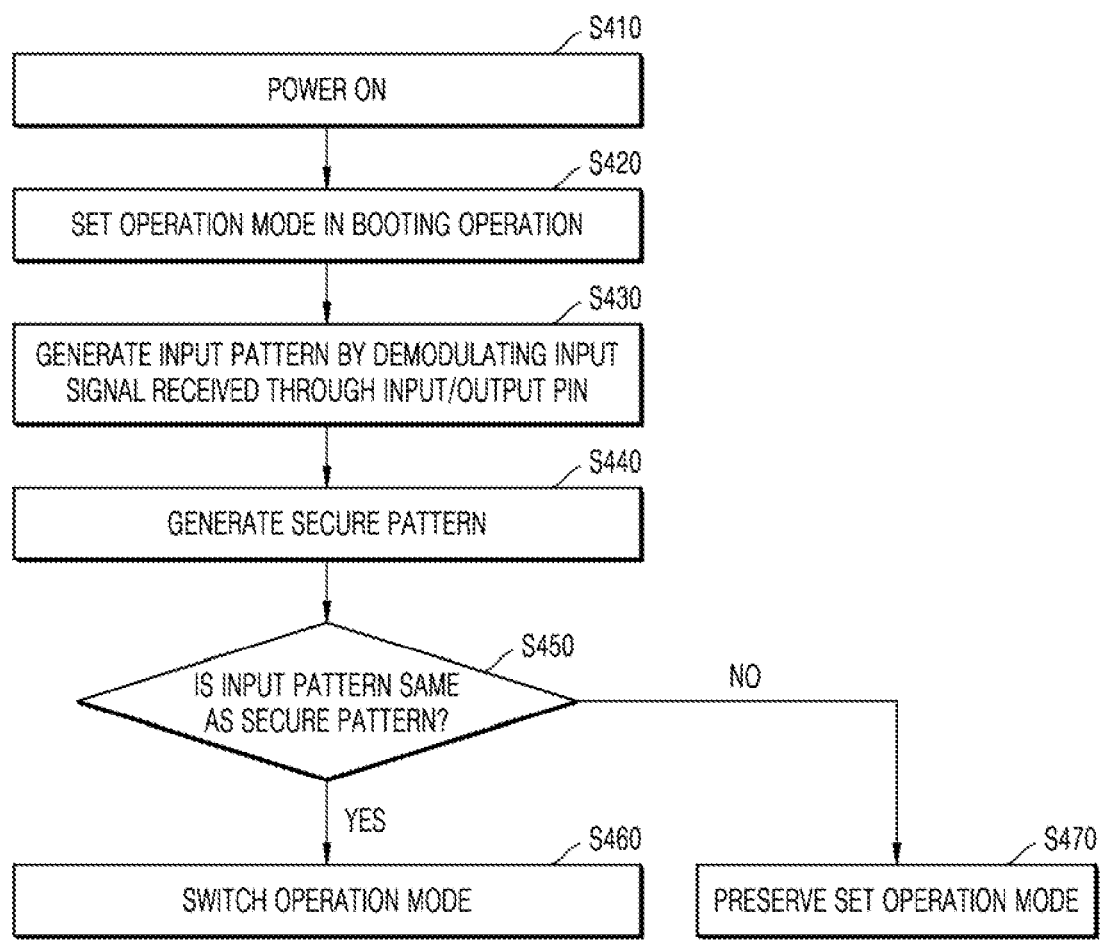
FIG. 9 is a flowchart of an operating method of the system controller of FIG. 8.

FIG. 9 is a flowchart of an operating method of the system controller 10a of FIG. 8.

Referring to FIG. 9, in operation S410, the integrated circuit chip 1 including the system controller 10a may be powered on. A booting operation may be performed, and in the booting operation, the system controller 10a may set an operation mode in operation S420. For example, the mode setting module 120a of the system controller 10a may read mode setting data from the mode cell MDC of the memory 400a and set an operation mode according to the read mode setting data.

In this case, the mode controller 110a may generate an input pattern by demodulating an input signal received from the outside through an input/output pin in operation S430 and generate a secure pattern therein in operation S440. The mode controller 110a may determine whether the input pattern is the same as the secure pattern in operation S450, and when the input pattern is the same as the secure pattern, switch the operation mode in operation S460. The mode setting module 120a may receive a mode switching enable signal and second mode setting data from the mode controller 110a and switch to an operation mode according to the received second mode setting data in response to the mode switching enable signal.

Otherwise, when the input pattern is not the same as the secure pattern, the mode setting module 120a may maintain a set operation mode in operation S470. When the input pattern is not the same as the secure pattern, the mode controller 110a may stop an operation as described with reference to FIGS. 5 and 7. Accordingly, the mode setting module 120a may not receive a valid signal from the mode controller 110a. Therefore, the mode setting module 120a may maintain a preset operation mode.

Figure 10:
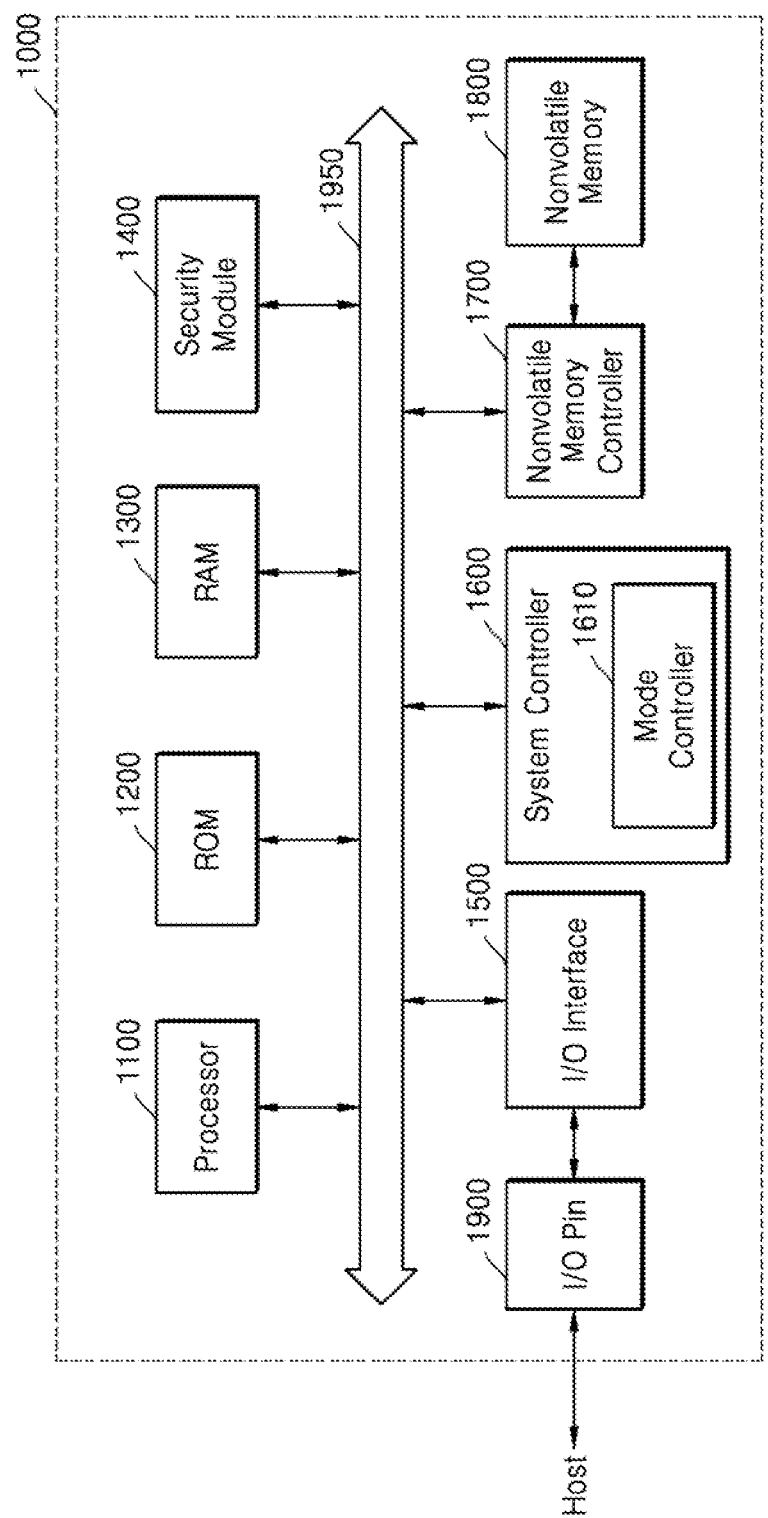
FIG. 10 is a block diagram of a system on chip according to an example embodiment.

FIG. 10 is a block diagram of a system on chip 1000 according to an example embodiment. The system on chip 1000 may be, for example, a smart card chip.

Referring to FIG. 10, the system on chip 1000 may include a processor 1100, ROM 1200, RAM 1300, a security module 1400, an input/output interface 1500, a system controller 1600, a nonvolatile memory controller 1700, a nonvolatile memory 1800, and an input/output pin 1900, and the processor 1100, the ROM 1200, the RAM 1300, the security module 1400, the input/output interface 1500, the system controller 1600, and the nonvolatile memory controller 1700 may communicate with each other through a system bus 1950. The system on chip 1000 may further include other components, and for example, the system on chip 1000 may further include an encryptor/decryptor capable of encrypting or decrypting data, a wireless communication interface capable of wirelessly communicating an external device, and the like.

The processor 1100 may include a central processing unit (CPU), a microprocessor, or the like, to control a general operation of the system on chip 1000. According to an example embodiment, the processor 1100 may be implemented by a multi-core processor, for example, a dual-core processor or a quad-core processor.

The ROM 1200 may store an operating system of the system on chip 1000.

The RAM 1300 may be implemented by a volatile memory such as dynamic RAM (DRAM) or static RAM (SRAM), or a nonvolatile memory, and may temporarily store instructions or data to be used by the processor 1100. Firmware (FW) may be loaded on the RAM 1300. The FW may include instruction codes related to various operation algorithms of the system on chip 1000. The FW may be stored in the nonvolatile memory 1800 of the system on chip 1000 or in an external nonvolatile memory, and when the system on chip 1000 is powered on, the FW may be loaded on the RAM 1300.

The security module 1400 may protect the system on chip 1000 from hacking or a physical intrusion from the outside. The system on chip 1000 such as a smart card chip may be used in various ways in various fields such as communication, financial, traffic, and e-commerce fields and the like, for which high security is desired. When hacking or a physical intrusion from the outside is detected, the security module 1400 may reset the system on chip 1000 so as to protect data stored in the nonvolatile memory 1800.

The input/output interface 1500 may support an interface between the system on chip 1000 and an external device, for example, a host. The input/output interface 1500 may be implemented by a serial input output (SIO) interface, an SD card interface, an MMC interface, an XD card interface, a smart media (SM) card interface, a universal serial bus (USB) interface, or the like.

The system controller 1600 may control a system configuration of the system on chip 1000 and may control, for example, power, a clock signal, system reset, and the like. The system controller 1600 may include a mode controller 1610, and may determine or switch an operation mode of the system on chip 1000.

The system controller 10 or 10a and the mode controller 100 or 110a described with reference to FIGS. 1 to 9 may be applied as the system controller 1600 and the mode controller 1610 of FIG. 10. The mode controller 1610 may generate an input pattern by demodulating an input signal received through the input/output pin 1900, and when the input pattern is the same as a secure pattern generated therein, control switching of an operation mode of the system on chip 1000. According to an example embodiment, the mode controller 1610 may switch the operation mode of the system on chip 1000 to the test mode.

The nonvolatile memory controller 1700 may control the nonvolatile memory 1800 so as to store data in the nonvolatile memory 1800 or read stored data from the nonvolatile memory 1800. The nonvolatile memory controller 1700 may provide an interface between the nonvolatile memory 1800 and other components.

The nonvolatile memory 1800 may indicate a memory or a memory device having a characteristic of preserving stored data even though power is off. Therefore, even if power supplied to the system on chip 1000 is cut off, data stored in the nonvolatile memory 1800 may be preserved. The nonvolatile memory 1800 may include, for example, a NAND flash memory, a vertical NAND (VNAND) memory, a NOR flash memory, resistive random access memory (RRAM), phase-change random access memory (PRAM), magnetoresistive random access memory (MRAM), ferroelectric random access memory (FRAM), spin transfer torque random access memory (STT-RAM), or the like. In an implementation, the nonvolatile memory 1800 may be implemented by a three-dimensional array structure or the like. In an implementation, the nonvolatile memory 1800 may be implemented by a magnetic disk device.

According to an example embodiment, one region of the nonvolatile memory 1800 may store therein option values set for configuration control of the system on chip 1000. For example, the nonvolatile memory 1800 may include the mode cell MDC described with reference to FIG. 8 and store mode setting data. The mode setting data may be provided to the system controller 1600 when the system on chip 1000 is booted, and then used for mode setting of the system on chip 1000.

The input/output pin 1900 may be electrically connected to the external device, for example, the host, and the input/output pin 1900 may receive a signal from the host and output a signal to the host. The signal received through the input/output pin 1900 may be provided to other components, for example, the processor 1100, the ROM 1200, the RAM 1300, the security module 1400, the system controller 1600, and the nonvolatile memory controller 1700, through the input/output interface 1500.

As described above, embodiments relate to semiconductor device and, more particularly, to a mode controller for switching an operation mode based on pattern data received from the outside, and an integrated circuit chip including the same. Embodiments may provide a mode controller for switching an operation mode based on a particular pattern included in an input signal received through a general input/output pin and an integrated circuit chip including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An integrated circuit chip, comprising:
a plurality of function blocks;
a mode controller configured to convert an input signal, received from an external device through an input/output pin, into a multi-bit input pattern and test mode setting data, and to output the test mode setting data and a test mode switching enable signal when a secure pattern generated therein is the same as the multi-bit input pattern; and
a mode setting module configured to control the plurality of function blocks to operate in a test mode according to the test mode setting data, in response to the test mode switching enable signal,
wherein:
the mode controller includes a demodulator configured to demodulate the input signal into the multi-bit input pattern,
the demodulator includes a counter and a processing logic,
the counter is configured to receive a clock signal, to count a level of the input signal based on the clock signal, and to provide counting values to the processing logic, and
the processing logic is configured to convert the counting values into bits of the multi-bit input pattern.

2. The integrated circuit chip as claimed in claim 1, wherein:
the demodulator sequentially converts the input signal into the multi-bit input pattern and the test mode setting data, and
the mode controller further includes:
a random number generator configured to generate the secure pattern; and
a comparator configured to compare the multi-bit input pattern to the secure pattern, and output the test mode setting data and the test mode switching enable signal.

3. The integrated circuit chip as claimed in claim 2, wherein the comparator is further configured to compare the multi-bit input pattern to the secure pattern bit by bit, and when the compared bits are not identical, end an operation.

4. The integrated circuit chip as claimed in claim 2, wherein the comparator is further configured to output the test mode setting data and the test mode switching enable signal, and then end an operation.

5. The integrated circuit chip as claimed in claim 2, wherein:
the comparator includes a state machine configured to change a state based on data received from the demodulator and data received from the random number generator, and
the state machine is further configured to enter an infinite loop when the multi-bit input pattern is not the same as the secure pattern or when the test mode setting data and the test mode switching enable signal are output, such that the comparator ends an operation.

6. The integrated circuit chip as claimed in claim 2, wherein the demodulator is further configured to output a demodulated bit and a ready signal every time the input signal is demodulated by one bit.

7. The integrated circuit chip as claimed in claim 6, wherein:
the random number generator is further configured to generate random numbers constituting the secure pattern, in synchronization with the ready signal, and
the comparator is further configured to receive the secure pattern and the multi-bit input pattern, in synchronization with the ready signal.

8. The integrated circuit chip as claimed in claim 2, wherein:
the demodulator is further configured to generate a frame start pattern indicating the start of a frame by demodulating the input signal, and
the comparator is further configured to generate a start signal when the frame start pattern is received from the demodulator, and to provide the start signal as an enable signal for the random number generator.

9. The integrated circuit chip as claimed in claim 1, wherein the input signal is received through the input/output pin.

10. The integrated circuit chip as claimed in claim 1, further comprising a memory configured to store the test mode setting data,
wherein the mode setting module is further configured to control the plurality of function blocks to operate in a test mode according to the test mode setting data when the integrated circuit chip is powered on, and control the plurality of function blocks to operate in the test mode in response to the test mode switching enable signal when the test mode setting data and the test mode switching enable signal are received from the mode controller.

11. A mode controller for controlling operation mode switching of an integrated circuit chip that includes the mode controller, the mode controller comprising:
a demodulator configured to use a single wire protocol to demodulate an input signal, received in series from an external device through an input/output pin, into a multi-bit input pattern and test mode setting data;
a random number generator configured to generate a secure pattern for mode switching; and
a comparator configured to receive the multi-bit input pattern and test mode setting data from the demodulator and the secure pattern from the random number generator, compare the multi-bit input pattern to the secure pattern, and to output the test mode setting data and a test mode switching enable signal when the multi-bit input pattern is the same as the secure pattern;
wherein:
the demodulator includes a counter and a processing logic, the counter is configured to receive a clock signal, to count a level of the input signal based on the clock signal, and to provide counting values to the processing logic, and the processing logic is configured to convert the counting values into bits of the multi-bit input pattern.

12. The mode controller as claimed in claim 11, wherein the demodulator is further configured to count a level of the input signal in a period between edges of the input signal, and generate the multi-bit input pattern and the test mode setting data based on the count.

13. The mode controller as claimed in claim 11, wherein the demodulator is further configured to demodulate the multi-bit input signal on a bitwise basis and provide a demodulated bit and a ready signal to the comparator.

14. The mode controller as claimed in claim 11, wherein the comparator is further configured to enable the random number generator when a plurality of bits received from the demodulator are the same as a preset particular pattern.

15. The mode controller as claimed in claim 11, wherein the comparator is further configured to compare the multi-bit input pattern to the secure pattern bit by bit, and when the compared bits are not identical, end an operation.

16. The mode controller as claimed in claim 11, wherein the comparator is further configured to output the test mode setting data and the test mode switching enable signal, and then end an operation.

17. The mode controller as claimed in claim 11, wherein the test mode switching enable signal transits from an activation level to an inactivation level after mode switching of the integrated circuit chip is performed according to the test mode setting data.

18. A system on chip, comprising:

a processor;

a volatile memory configured to store instructions and data to be used by the processor;

a nonvolatile memory configured to store user data; and a mode controller configured to convert an input signal, received in series from an external device through one input/output pin, into input data, and to control an operation mode of the system on chip to be switched to a test mode when a multi-bit input pattern included in the input data matches a secure pattern generated therein, wherein the mode controller includes a demodulator configured to demodulate the input signal into the multi-bit input pattern using a single wire protocol;

wherein:

the demodulator includes a counter and a processing logic, the counter is configured to receive a clock signal, to count a level of the input signal based on the clock signal, and to provide counting values to the processing logic, and the processing logic is configured to convert the counting values into bits of the multi-bit input pattern.

* * * * *